US008910611B2

(12) United States Patent
Honnikoppa et al.

(10) Patent No.: US 8,910,611 B2
(45) Date of Patent: Dec. 16, 2014

(54) FLUID DELIVERY SYSTEM AND METHOD OF FORMING FLUID DELIVERY SYSTEM

(75) Inventors: Shashikumar Honnikoppa, Ann Arbor, MI (US); John Kapcoe, Carleton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 167 days.

(21) Appl. No.: 13/617,491

(22) Filed: Sep. 14, 2012

(65) Prior Publication Data

US 2014/0076266 A1 Mar. 20, 2014

(51) Int. Cl.

*F01M 1/02* (2006.01)
*F02M 35/10* (2006.01)
*F02B 77/04* (2006.01)

(52) U.S. Cl.

USPC ............... 123/196 R; 123/184.61; 123/198 E

(58) Field of Classification Search

CPC .... F01M 11/02; F01M 1/20; F02B 2075/027; F02B 67/04; F02B 67/06; F02B 75/22; F02B 77/13; F02B 63/02; F02M 35/024; F02M 35/10321; F02M 35/10347; F05C 2225/08; B23K 20/122; B23K 20/129; B23K 20/126

USPC ................ 123/196 R, 195 A, 198 E, 184.61; 228/112.1

See application file for complete search history.

(56) References Cited

U.S. PATENT DOCUMENTS

| | | | | |
|---|---|---|---|---|
| 5,135,592 | A | 8/1992 | Melvin | |
| 5,228,420 | A * | 7/1993 | Furuya et al. | 123/90.38 |
| 6,817,325 | B2 * | 11/2004 | Dinkel et al. | 123/90.13 |
| 8,042,508 | B2 | 10/2011 | Kumagai et al. | |
| 8,048,246 | B2 | 11/2011 | Perez Madueno et al. | |
| 8,113,167 | B2 | 2/2012 | Jessberger et al. | |
| 2004/0032470 | A1 * | 2/2004 | Perkins et al. | 347/86 |
| 2010/0180854 | A1 | 7/2010 | Baumann et al. | |

* cited by examiner

*Primary Examiner* — Noah Kamen
*Assistant Examiner* — Syed O Hasan
(74) *Attorney, Agent, or Firm* — Gifford, Krass, Sprinkle, Anderson & Citkowski, P.C.

(57) ABSTRACT

A fluid delivery system formed of a first component and a second component. The first component includes a first surface and a pair of first walls extending outwardly from the first surface. The second component includes a second surface facing the first surface. The second component includes a pair of second walls and a pair of inner walls which both extend outwardly from the second surface. Each of the pair of second walls and each of the pair of first walls are vibrationally welded at a primary weld joint. The pair of inner walls extends outwardly from the second surface and sealingly contacts the first surface to define a fluid passage and a pair of cavities on either side of the fluid passage. Weld flash formed during the vibrational welding of the primary joints is contained within the pair of cavities and prevented from entering the fluid passage.

20 Claims, 5 Drawing Sheets

12
14
16
18
22
30
32
34
5
6

14
18
22
38
40
42

FLUID DELIVERY SYSTEM AND METHOD OF FORMING FLUID DELIVERY SYSTEM

FIELD OF THE INVENTION

The present invention relates to a fluid delivery system having a fluid passage formed by welding two components together. More particularly, the present invention relates to a camshaft oil shower delivery system in which the two pieces of injection molded plastic form an oil passage having a double wall that prevents weld flash formed during the vibration welding from entering the fluid passage and clogging the outlets of the fluid passage.

BACKGROUND OF THE INVENTION

Internal combustion engines are typically provided with an oil shower delivery system used to spray lubrication oil on the camshaft lobes. The previously known oil shower delivery systems are formed of a steel shower pipe that is attached to a steel baffle plate. The oil shower delivery system is attached to an interior of the cylinder head cover of the internal combustion engine.

A particular disadvantage of the previously known oil shower delivery systems is the complicated production process of the system. Specifically, the oil shower delivery system is formed of two metallic parts, each of which include multiple operations to form, thereby increasing the time and expense required for the steel oil shower delivery pipe.

In addition to the increased operation cost of preparing the steel oil shower pipe delivery system, the formation of the system from two steel components increases the overall weight of the internal combustion engine and therefore the automotive vehicle. However, as the spray holes or outlets are required to have a precise size and shape in order to ensure proper oil spray for the lubrication of the camshaft lobes, forming the oil shower pipe delivery system from a plastic component is problematic.

In particular, the bonding of a plastic shower plate and a plastic baffle plate to form a plastic oil shower delivery system using vibration welding produces weld flash. Due to the precise size and shape of the spray holes, the weld flash in the oil passage could potentially clog the spray holes which will prevent the proper oil dispersion. As the oil passage of the oil shower delivery system is sealed, any weld flash debris within the oil renders the entire plastic oil shower delivery system defective.

Thus, there exists a need for an improved oil shower delivery system formed of a plastic material which prevents weld flash that is formed during the vibrational welding of the plastic shower plate to the plastic baffle plate from entering the oil passage and thereby reducing the percentages of oil shower delivery systems which are rendered defective.

SUMMARY OF THE INVENTION

The present invention provides an improved fluid delivery system which overcomes the above mentioned disadvantage of the previously known fluid delivery systems.

In brief, a fluid delivery system formed of two pieces of injection molded plastic provides a fluid passage having a double wall configuration which prevents weld flash, formed during the vibrational welding, from entering the fluid passageway. The fluid delivery system includes a first component and a second component. The first component includes a surface and a pair of first walls extending outwardly from the first surface. The second component includes a surface facing the surface of the first component. The second component includes a pair of second walls and a pair of inner walls which both extend outwardly from the surface of the second component. Each one of the pair of second walls is welded to a corresponding one of the pair of first walls at primary weld joints. The pair of inner walls extends outwardly from the surface of the second component and sealingly contacts the surface of the first component to define a fluid passage and a pair of cavities each one of the pair of cavities positioned on each side of the fluid passage.

The first component is an injection molded plastic shower plate and the second component is an injection molded plastic baffle plate. Each of the distal ends of the pair of second walls are vibrationally welded to each of the corresponding distal ends of the pair of first walls to form the primary weld joints. The distal ends of each of the pair of inner walls is vibrationally welded to the surface of the first component at secondary weld joints. A penetration depth of the primary weld joint is greater than a penetration depth of the secondary weld joint.

A method of forming a fluid delivery system which prevents weld flash from entering the fluid passage is also provided. The method includes the step of providing a first component formed of plastic material and having a surface and a pair of first walls extending outwardly from the surface. Providing a second component formed of a plastic material and having a surface facing the surface of the first component. The second component having a pair of second walls extending outwardly from the surface of the second component and a pair of inner walls extending outwardly from the surface of the second component between the pair of second walls. Vibrationally welding the first component to the second component such that each one of the pair of second walls and a corresponding one of the pair of first walls are bonded at primary weld joints. The pair of inner walls are bonded to the surface of the first component at secondary weld joints so as to define a first passage between the pair of inner walls and a pair of cavities, each one of the pair of cavities positioned on each side of the fluid passage.

BRIEF DESCRIPTION OF THE DRAWINGS

A better understanding of the present invention will be had upon reference to the following detailed description when read in conjunction with the accompany drawings, wherein like reference characters refer to like parts throughout the several views and in which.

DETAILED DESCRIPTION OF THE INVENTION

The present invention has utility as a fluid delivery system that provides a fluid passage having a double wall construction that prevents debris, such as weld flash, from entering the fluid passage and clogging the outlets of the fluid passage.

Forming the fluid delivery system from two plastic components that are vibrationally welded at primary weld joints that are sealed from the fluid passage provides a cost effective fluid delivery system in which the probability of debris clogging the spray holes is reduced.

Figure 1:
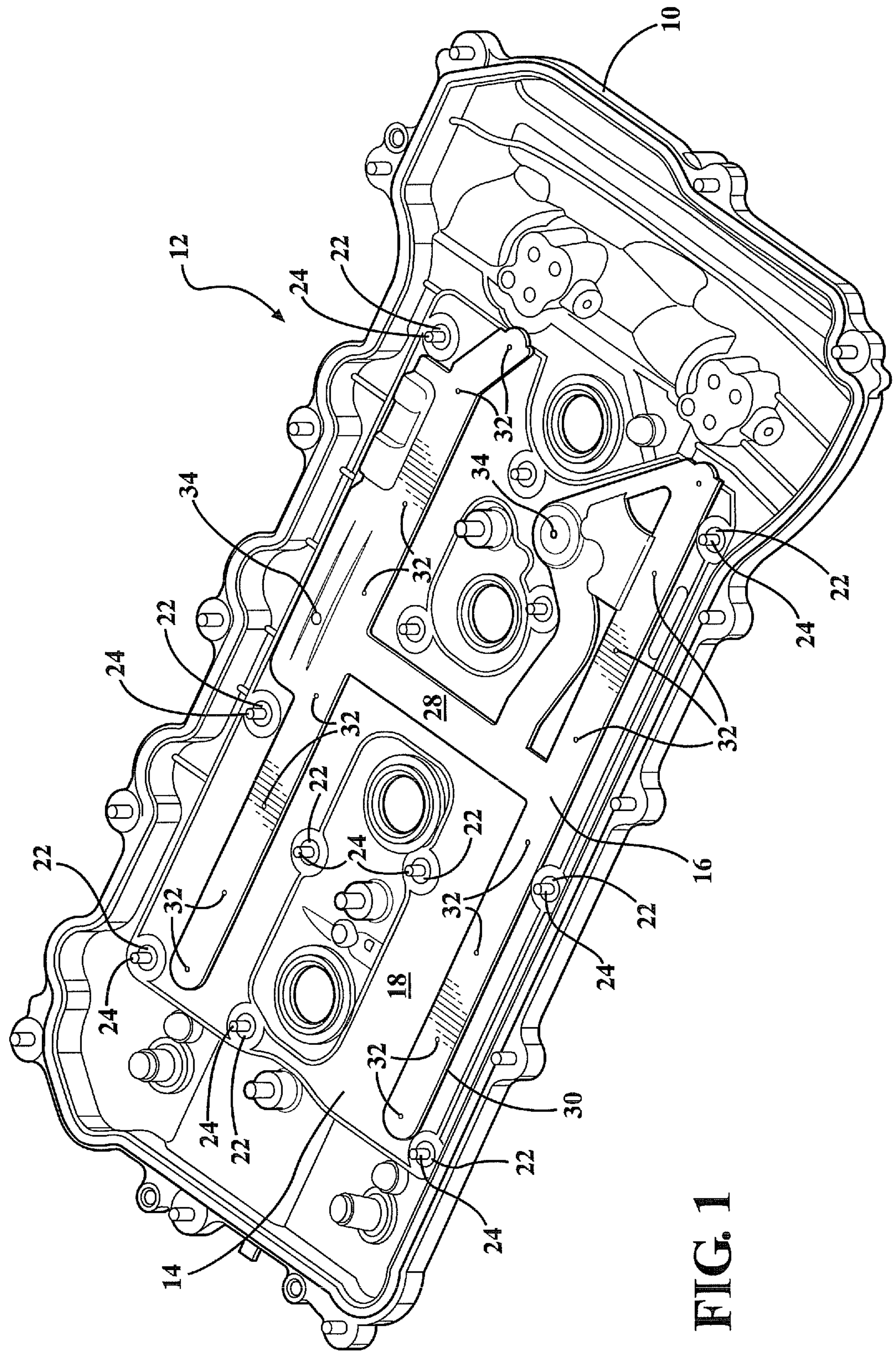
FIG. 1 is a perspective view illustrating the inventive fluid delivery system.
Figure 2:
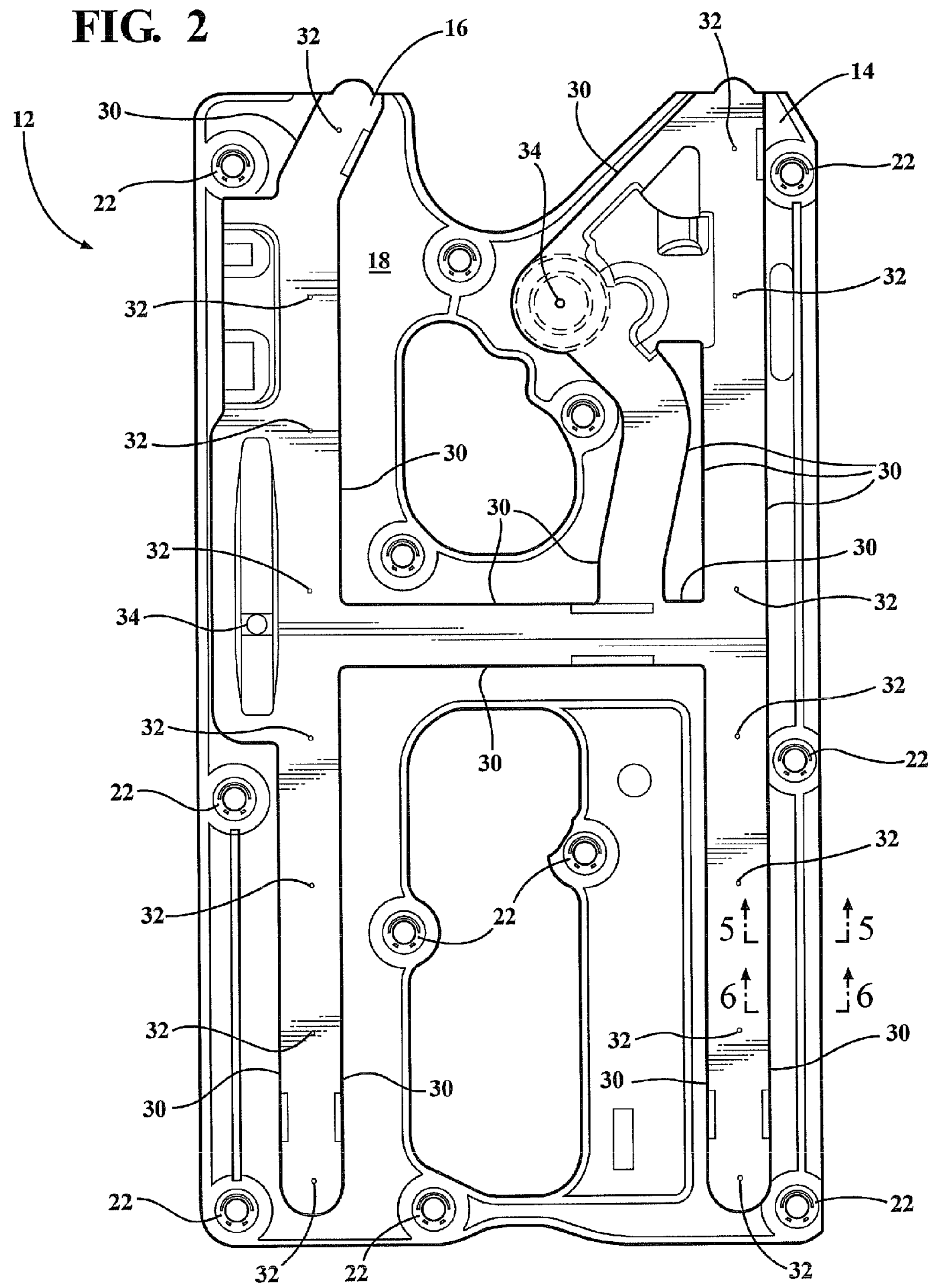
FIG. 2 is a plan view of the shower plate attached to the baffle plate.

With reference to FIG. 1, a cylinder head cover of an automotive engine is generally illustrated at 10. The cylinder head cover 10 is attached to a cylinder block (not shown) which includes a camshaft for actuating the exhaust valves and the intake valves. In order to provide proper operation of the camshaft, an oil delivery shower system 12 is attached to an interior of the cylinder head cover 10. The oil shower delivery system 12 is used to provide a spray of lubricating oil onto the lobes of the camshaft during operation of the internal combustion engine.

The oil shower delivery system 12 is formed of a baffle plate 14 and a shower plate 16. The baffle plate 14 is formed of a plastic material using an injection molding process. Similarly, the shower plate 16 is formed of a plastic material during an injection molding process. By forming the baffle plate 14 and the shower plate 16 of a plastic material, the overall weight of the oil shower delivery system 12 and, consequently, the internal combustion engine can be reduced. Further, the formation of the baffle plate 14 and the shower plate 16 using an injection molding process simplifies the formation of each of the baffle plate 14 and the shower plate 16 and reduces the time and material expense of the formation of the oil shower delivery system 12.

With reference to FIGS. 1-3A, the baffle plate 14 is a generally planar plate-like structure having an interior surface 18 and an opposite exterior surface 20. The baffle plate 14 is provided with a plurality of apertures 22 which correspond to a plurality of connectors 24 formed on the interior of the cylinder head cover 10. The baffle plate 14 is secured to the interior of the cylinder head cover 12 by the connection of the connectors 24 and the plurality of apertures 22. The shower plate 16 is itself attached to the baffle plate 14 as will be discussed in greater detail below.

In the illustrated embodiment, the cylinder head cover 10 is formed of a metallic material, particularly aluminum, and the connectors 24 are formed as outwardly extending bosses which engage with the apertures 22 so as to secure the oil shower delivery system 12 to the cylinder head cover 10 through a heat staking operation. It is appreciated, of course, that the connectors 24 are not limited to the outwardly extending bosses and the oil shower delivery system 12 is optionally attached to the cylinder head cover 12 through various other means of attaching one object to another as known by one of ordinary skill in the art. For example, the connectors 24 optionally include internal threads and fasteners (not shown) which extend through the apertures 22 to engage the connectors 24 thereby securing the oil shower delivery system 12 to the cylinder head cover 10.

The shower plate 16 has a generally H shape having a pair of parallel legs interconnected by a traversing arm. The shower plate 16 includes an inner surface 26 and an opposite exterior surface 28. The shower plate 16 has a plurality of spray holes or outlets 32 which extend between the interior surface 26 and the exterior surface 28. The outlets 32 are disposed along the shower plate 16 at predetermined positions to correspond to the lobes of the camshaft. At least one inlet 34 is connected to an oil supply which provides oil into the oil shower delivery system 12 and the oil is dispensed from the various outlets 32.

Figure 3A:
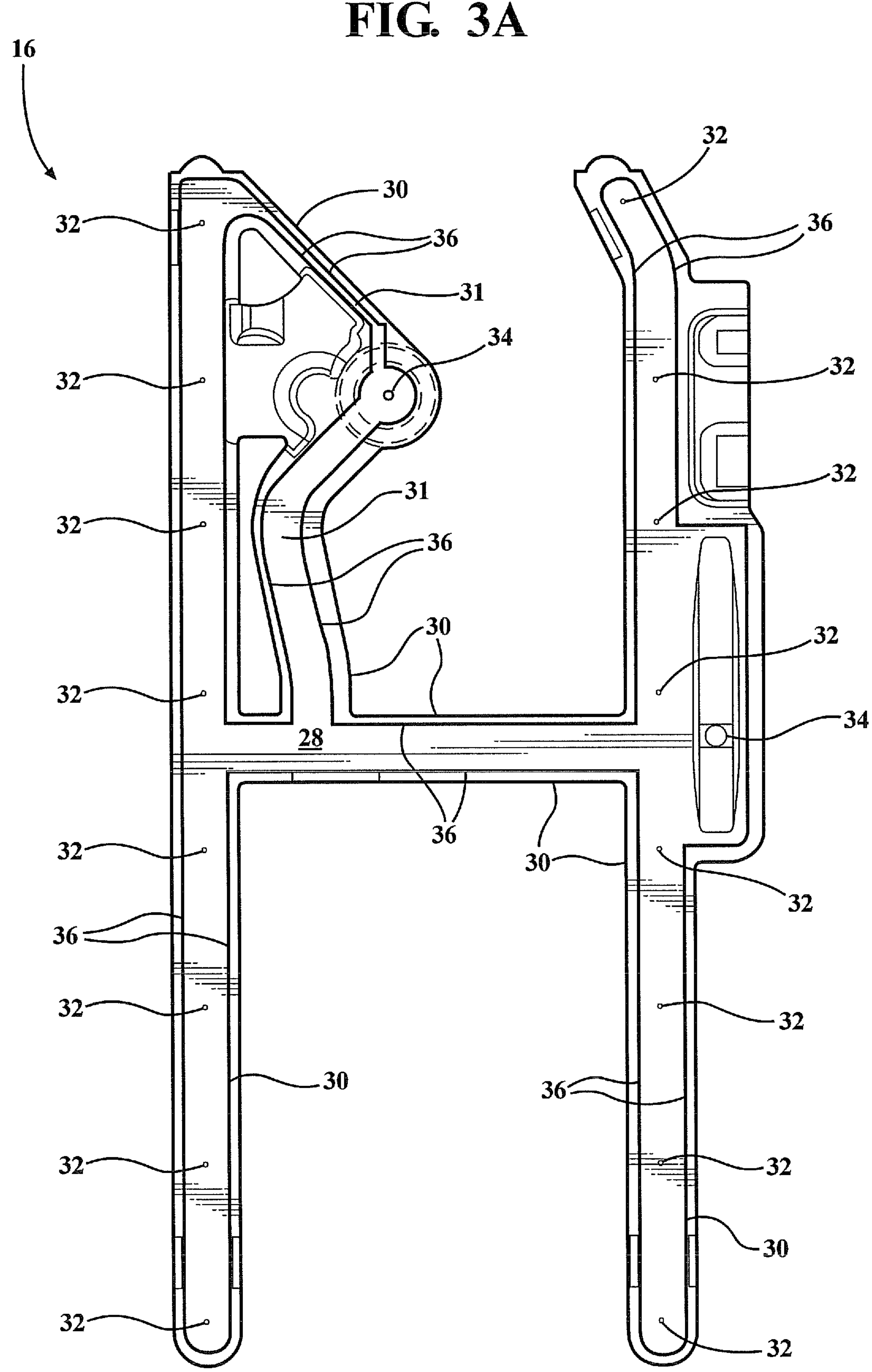
FIG. 3A is a plan view of an interior side of the shower plate.

The connection of the baffle plate 14 and the shower plate 16 will now be described. The shower plate 16 includes a pair of first walls 36 that extend outwardly from the interior surface 26 of the shower plate 16. The pair of first walls 36 are spaced apart from the perimeter edge 30 of the shower plate 16. The pair of first walls 36 define a continuous channel along the shower plate 16. As seen in FIG. 3A, the pair of first walls 36 is a continuous wall that extends along the entire perimeter of the shower plate 16 a predetermined distance from the perimeter edge 30. The shower plate 16 includes inlet arms 31 which connect on the inlets 34 with one of the pair of legs and the traversing arm. It is appreciated, of course, that the shower plate 16 optionally includes only a single inlet 34 positioned on the shower plate 16 so as to be in communication with the channel formed by the pair of first walls 36.

Figure 3B:
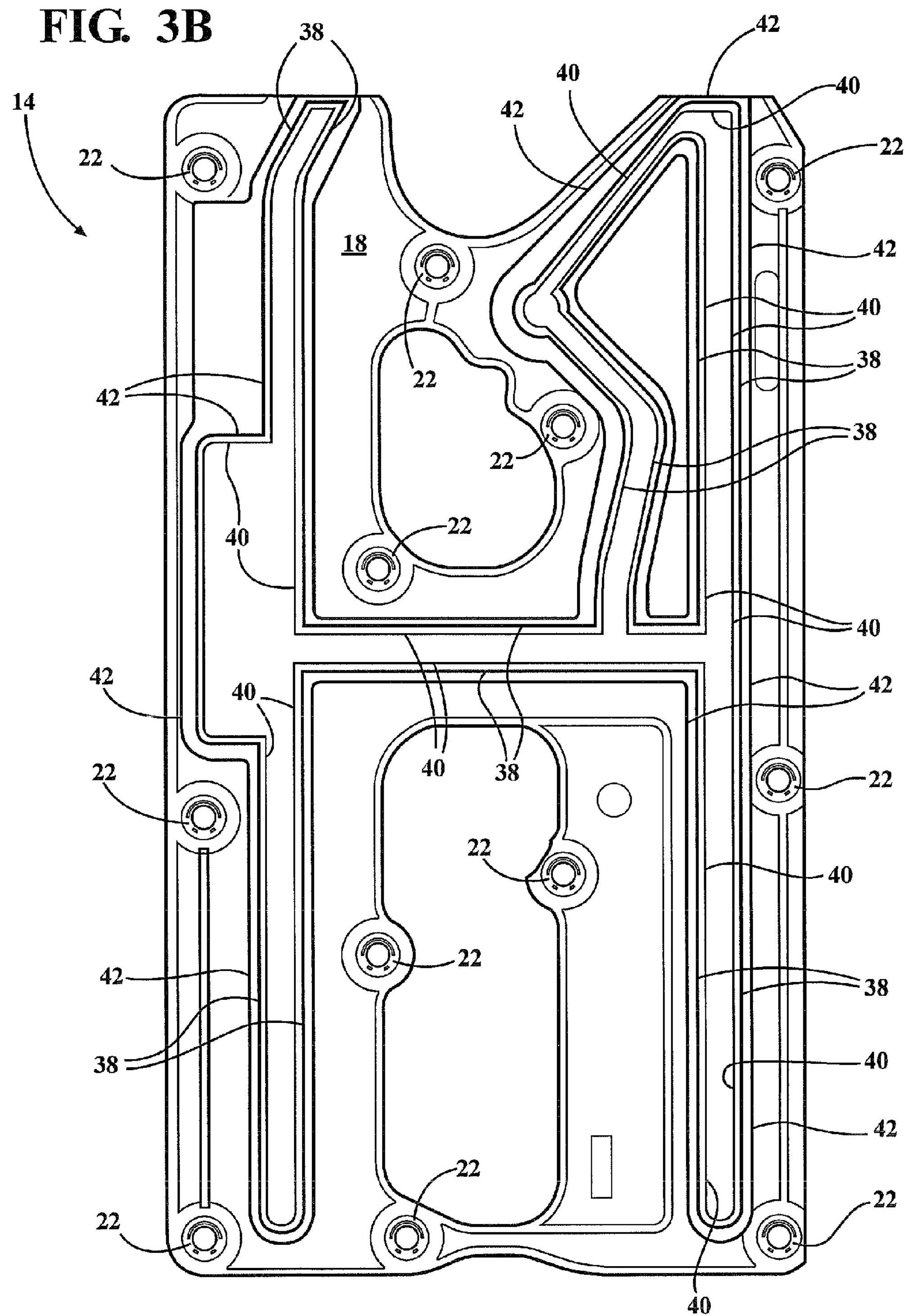
FIG. 3B is a plan view an interior side of the baffle plate.

The baffle plate 14 includes a pair of second walls 38 that extend outwardly from the interior surface 18 of the baffle plate 14. The pair of second walls 38 are spaced apart a predetermined distance generally equal to the distance between the pair of first walls 36 such that the position of each one of the pair of first walls 36 corresponds to the position of one of the pair of second walls 38. As seen in FIG. 3B, the pair of second walls 38 is a continuous wall that extends along the entire perimeter of the baffle plate 14 a predetermined distance apart so as to correspond to the channel formed by the pair of first walls 36 on the shower plate 16.

The baffle plate 14 further includes a pair of inner walls 40 positioned between the pair of second walls 38. The pair of inner walls 40 have a height greater than the height of each pair of second walls 38 and the pair of first walls 36. As seen in FIG. 3B, the pair of inner walls 40 is a continuous wall that extends along the baffle plate 14 to define a channel between the pair of second walls 38.

The baffle plate 14 further includes a pair of outer walls 42 that extend outwardly from the interior surface 18 of the baffle plate 14. One of the pair of outer walls 42 is placed on either side of the pair of second walls 38. The pair of outer walls 42 have a height that is greater than the pair of second walls 38 but is less than the height of the pair of inner walls 40. The distance between the outer sides of each of the pair of outer walls 42 generally corresponds to the width of the shower plate 16 between corresponding perimeter edges 30. As seen in FIG. 3B, the pair of outer walls 42 is a continuous wall that extends along the baffle plate 14 to define a channel that encompasses the channel formed by the pair of second walls 38.

Figure 4:
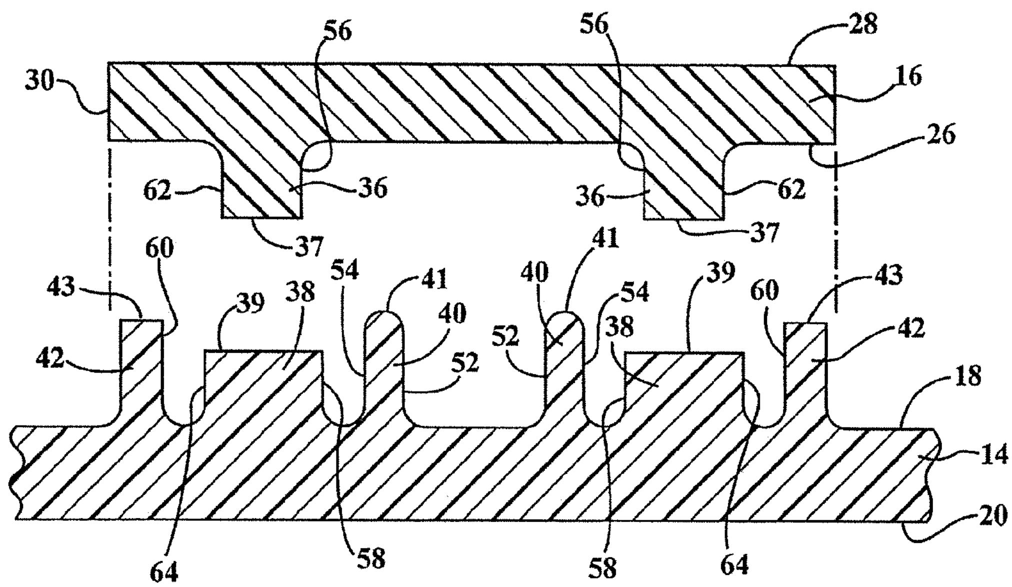
FIG. 4 is a cross-sectional view illustrating the shower plate and the baffle plate prior to attachment.
Figure 5:
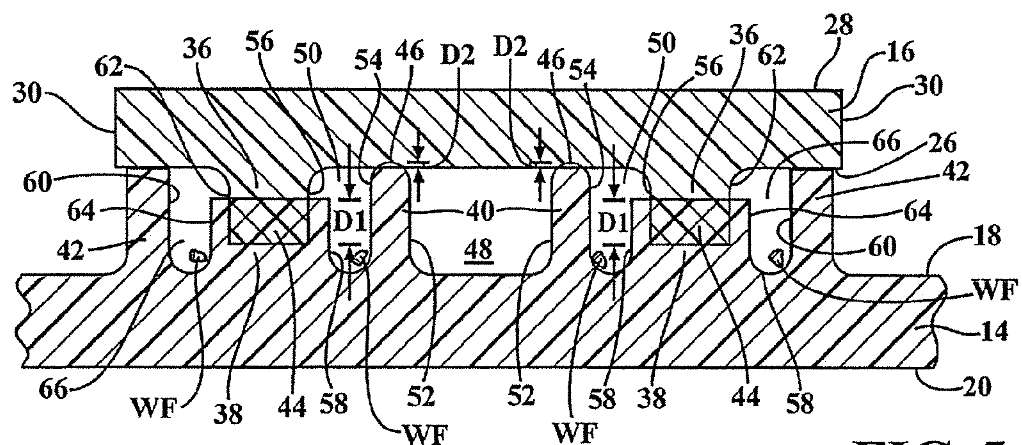
FIG. 5 is a cross-sectional view taken along line 5-5 of FIG. 2.
Figure 6:
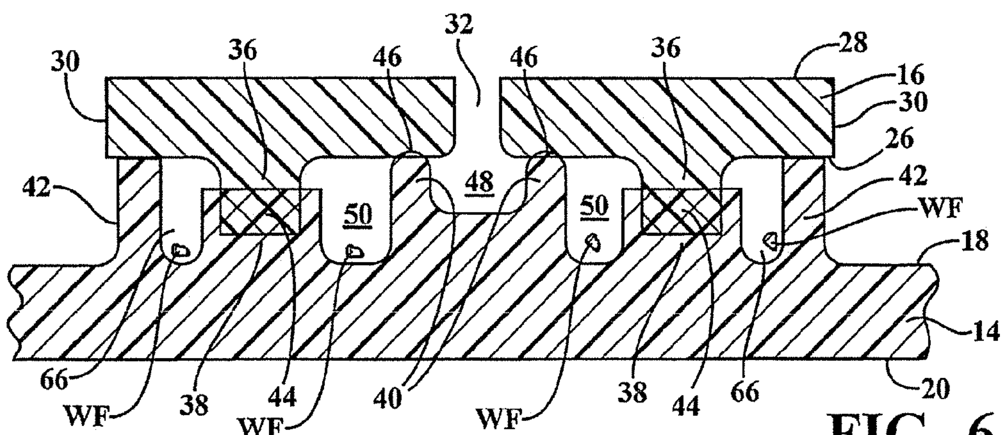
FIG. 6 is a cross-sectional view taken along line 6-6 of FIG. 2.

With reference to FIGS. 4-6, a process known as ultrasonic or vibration welding is employed so as to fixedly secure the baffle plate 14 to the shower plate 16. In the vibration welding process, an anvil (not shown) is placed in abutting contact with one of each of the exterior surface 20 of the baffle plate 14 or the exterior surface 28 of the shower plate 16, and a welding horn (not shown) is placed in abutting contact with the other of the exterior surface 20 of the baffle plate 14 and the exterior surface 28 of the shower plate 16. As the baffle plate 14 and the shower plate 16 are brought together with the interior surfaces 18 and 26 facing each other, the distal ends 37 of each of the pair of first walls 36 and the distal ends 39 of each of the corresponding pair of second walls 38 are placed in contact. Initially the distal ends 37 of the pair of first walls 36 and the distal ends 39 of the pair of second walls 38 are the only portions of the baffle plate 14 and the shower plate 16 which are in contact.

Upon initiation of the vibration welding process a pressure is applied to the welding horn in order to keep the exterior surface 20 of the baffle plate and the exterior surface 28 of the shower plate in contact with the welding horn and the anvil. The welding horn then delivers ultrasonic vibrations which heat up the plastic forming the distal ends 37 of the pair of first walls 36 and the distal ends 39 of the pair of second walls 38.

The vibrations create frictional heat that causes the distal ends 37 of the pair of first walls 36 and the distal ends 39 of the pair of second walls 38 to melt and flow together creating primary welding joints 44 at each contact point of the pair of first walls 36 and the pair of second walls 38 along the entirety of the shower plate 16 and the baffle plate 14.

Upon continued application of pressure and vibration, the interior surface 18 of the baffle plate 14 and the interior surface 26 of the shower plate are brought closer together until distal ends 41 of the pair of inner walls 40 contact the interior surface 26 of the shower plate 16 between the pair of first walls 36. The vibrations at the contact point between the distal ends 41 of the pair of inner walls 40 and the interior surface 26 of the shower plate 16 cause the material to melt and flow together thereby forming secondary weld joints 46 at each contact point of the distal ends 41 of the pair of inner walls 40 and the interior surface 26 along the entirety of the shower plate 16 and the baffle plate 14. The vibration welding operation continues until the distal ends 43 of the pair of outer walls 42 contact the interior surface 26 of the shower plate 16.

Due to the lengths of the pair of first walls 36 and the pair of second walls 38, the primary weld joints 44 have a large penetration depth D1 of 1.2 millimeters. In contrast, as the pair of inner walls 40 have a height that is only slightly greater than the height of the pair of outer walls 42, which during the welding process act as a stopper to prevent additional displacement of the interior wall 26 of the shower plate 16 towards the interior surface 18 of the baffle plate 14, the secondary weld joints 46 have a relatively small penetration depth D2 of 0.2 millimeter.

The vibrational welding of the baffle plate 14 to the shower plate 16 at the primary weld joints 44 and the secondary weld joints 46 defines a fluid passage 48. Specifically, the fluid passage 48 is defined by the interior surface 26 of the shower plate 16, the interior surface 18 of the baffle plate 14, and the interior sides 52 of the pair of inner walls 40. As the pair of inner walls 40 are positioned so as to be on either side of the plurality of outlets 32 and inlets 34, the fluid passage 48 allows for the ingress of a fluid, such as lubricating oil, from the inlets 34 to be egressed from the plurality of outlets 32 along the oil shower delivery system 12. The secondary weld joints 46 provide a leak-proof seal between the interior surface 26 of the shower plate 16 and the interior surface 18 of the baffle plate 14. As the pair of first walls 36 is a continuous wall, the pair of second walls 38 is a continuous wall, an the pair of inner walls 40 is a continuous wall that defines a channel between the pair of second walls, the primary weld joints 44 bound the perimeter of the pair of inner walls 40.

As seen in FIGS. 5 and 6, the spacing of the pair of inner walls 40 and the pair of first walls 36 and pair of second walls 38 provides a pair of cavities 50 in which one cavity 50 is disposed on either side of the fluid passage 48. The cavities 50 on either side of the fluid passage 48 are sealed between the interior surface 18 of the baffle plate 14, the interior surface 26 of the shower plate 16, the outer sides 54 of the pair of inner walls 40, and the inner sides 56 of the pair of first walls 36 and the inner sides 58 of the pair of second walls 38. The cavities 50 are sealed due to the formation of the primary weld joints 44 and the secondary weld joints 46.

As the primary weld joints 44 must have a sufficient penetration depth D1 to secure the baffle plate 14 to the shower plate 16, the primary weld joints 44 are required to have a relatively large penetration depth D1. However, due to the large penetration depth D1 of the primary weld joints, weld flash WF is formed during the vibration welding process. Weld flash WF is formed of material adjacent the distal ends 37 of the pair of first walls 36 and distal ends 39 of the pair of second walls 38 which melted and disengaged from the primary weld joint 44. However, as the cavities 50 are sealed between the primary weld joints 44 and the secondary weld joints 46, the weld flash WF formed by the primary weld joints 44 is prevented from entering the fluid passage 48 and potentially clogging the outlets 32. As such, the fluid passage 48 is free of contamination as the weld flash WF is contained within the cavities 50.

The secondary weld joints 46 are primarily formed for leak prevention, as the primary weld joints 44 provide the strength required for securely bonding the baffle plate 14 to the shower plate 16. As such, the secondary weld joints 46 have the relatively small penetration depth of D2 of 0.2 millimeter, and weld flash is not formed during the formation of the secondary weld joints 46.

In addition, secondary cavities 66 are formed between the inner sides 60 of the pair of outer walls 42, the interior surface 18 of the baffle plate 14, the interior surface 26 of the shower plate 16, and the outer sides 62 of the pair of first walls 36 and the outer sides 64 of the pair of second walls 38. The secondary cavities 66 contain and prevent additional weld flash WF from exiting the oil shower delivery system 12. As such, any weld flash WF formed during the formation of the primary weld joints 44 is contained within the cavities 50 and the secondary cavities 66.

It is appreciated, of course, that the inventive oil shower delivery system 12 is not limited for use with the lubrication of camshafts of an internal combustion engine and is operable to provide a fluid delivery system formed of two injection molded plastic components which prevents weld flash from entering the fluid passageway which is in communication with at least one inlet and at least one outlet. Moreover, the invention is not limited to the illustrated embodiment, and is optionally formed with one or both of the pair of inner walls 40 and the outer wails 42 formed on the interior surface 26 of the shower plate 16.

From the foregoing, it can be seen that the present invention provides a fluid delivery system formed of two pieces of injection molded plastic components which prevents contamination of a fluid passage from weld flash formed during the vibration welding process. Having described the invention herein, however, many modifications thereto will become apparent to those skilled in the art to which it pertains without deviation from the spirit of the invention as defined by the scope of the appended claims.

It is claimed:

1. A fluid delivery system comprising:

a first component having a surface and a pair of first walls extending outwardly from said surface; and a second component having a surface facing said surface of said first component, said second component having a pair of second walls and a pair of inner walls positioned between said pair of second walls, said pair of second walls and said pair of inner walls extending outwardly from said surface of said second component;

each one of said pair of second walls is welded to a corresponding one of said pair of first walls at primary weld joints, said pair of inner walls sealingly contacts said surface of said first component to define a fluid passage therebetween and a pair of cavities, one of said pair of cavities positioned on either side of said fluid passage;

wherein distal ends of each of said pair of inner walls are vibrationally welded to said surface of said first component to form secondary weld joints, and wherein a penetration depth of each of said primary weld joints is greater than a penetration depth of each of said secondary weld joints.

2. The fluid delivery system of claim 1, wherein said first component is formed of a plastic material, and wherein said second component is formed of a plastic material, and wherein said primary weld joints are formed by vibrationally welding a distal end of each one of said pair of first walls to a corresponding distal end of each one of said pair of second walls.

3. The fluid delivery system of claim 2, wherein said vibrationally welding of said primary weld joints produces a weld flash, and wherein said weld flash is contained within said pair of cavities of either side of said fluid passage to prevent said weld flash from entering said fluid passage.

4. The fluid delivery system of claim 3, wherein said fluid passage includes an inlet formed in one of said first component and said second component and at least one outlet formed in one of said first component and said second component, and wherein said fluid passage is in fluid communication with said inlet and said at least one outlet.

5. The fluid delivery system of claim 4, wherein said pair of inner walls have a length that is greater than a length of each of said pair of first walls and said pair of second walls.

6. The fluid delivery system of claim 3, wherein each of said pair of inner walls are spaced apart from said pair of second walls, and wherein each one of said pair of cavities on each side of said fluid passage is defined by a space between an outer side of said pair of inner walls, an inner side of said pair of first walls, an inner side of said pair of second walls, said surface of said first component and said surface of said second component.

7. The fluid delivery system of claim 1, wherein said penetration depth of said primary weld joint is 1.2 mm and said penetration depth of said secondary weld joint is 0.2 mm.

8. The fluid delivery system of claim 1, wherein said second component includes a pair of outer walls extending outwardly from said surface of said second component, one of said pair of outer walls positioned on either side of said pair of second walls, each of said pair of outer walls having an end portion that abuttingly contacts said surface of said first component.

9. The fluid delivery system of claim 1, wherein said first component is a shower plate and said second component is a baffle plate.

10. An oil shower delivery system for an internal combustion engine, said oil delivery system comprising:

a shower plate formed of a plastic material, said shower plate having an interior surface and an opposite exterior surface, said shower plate having a pair of first walls extending outwardly from said interior surface, said shower plate having an inlet and at least one outlet extending between said interior surface and said exterior surface; and a baffle plate formed of a plastic material, said baffle plate having an interior surface and an opposite exterior surface, said interior surface of said baffle plate facing said interior surface of said shower plate, said baffle plate having a pair of second walls and a pair of inner walls positioned between said pair of second walls, said pair of second walls and said pair of inner walls extending outwardly from said interior surface of said baffle plate, each one of said pair of second walls is vibrationally welded to a corresponding one of said pair of first walls to form primary weld joints, a distal end of each of said pair of inner walls are vibrationally welded to said interior surface of said shower plate to form secondary weld joints that define a fluid passage therebetween and a pair of cavities, one of said pair of cavities positioned on either side of said fluid passage, said vibrationally welding of said pair of first walls and said pair of second walls to form said primary weld joints produces a weld flash, said weld flash is contained within said pair of cavities to prevent said weld flash from entering said oil passage, said oil passage in fluid communication with said inlet and said at least one outlet, wherein said pair of inner walls have a length that is greater than a length of each of said pair of first walls and said pair of second walls.

11. The oil shower delivery system of claim 10, wherein a penetration depth of said primary weld joint is greater than a penetration depth of said secondary weld joint.

12. The oil shower delivery system of claim 11, wherein said penetration depth of said primary weld joint is 1.2 mm and said penetration depth of said secondary weld joint is 0.2 mm.

13. The oil shower delivery system of claim 11, wherein said baffle plate includes a pair of outer walls extending outwardly from said interior surface of said baffle component, said pair of outer walls positioned on either side of said pair of second walls, each of said pair of outer walls having an end portion that abuttingly contacts said interior surface of said shower plate.

14. A method for forming a fluid delivery system, said method comprising:

providing a first component formed of a plastic material, said first component having a surface and a pair of first walls extending outwardly from said surface;

providing a second component formed of a plastic material, said second component having a surface facing said surface of said first component, said second component having a pair of second walls and a pair of inner walls, said pair of second walls extending outwardly from said surface of said second component, said pair of inner walls extending outwardly from said surface between said pair of second walls; and vibrationally welding said first component to said second component such that each one of said pair of second walls and a corresponding one of said pair of first walls are bonded at primary weld joints, and said pair of inner walls are bonded to said first surface at a secondary weld joint so as to define a fluid passage between said pair of inner walls and a pair of cavities, each one of said pair of cavities positioned on each side of said fluid passage, wherein a penetration depth of said primary weld joint is greater than a penetration depth of said secondary weld joint.

15. The method for forming a fluid delivery system of claim 14, wherein said pair of cavities prevents weld flash from said primary weld joints from entering said fluid passage.

16. The method for forming a fluid delivery system of claim 14, wherein said first component includes an inlet and a plurality of outlets, and wherein said fluid passage is in communication with said inlet and said plurality of outlets.

17. The method for forming a fluid delivery system of claim 16, wherein said first component is a shower plate and said second component is a baffle plate.

18. A fluid delivery system comprising:

a first component having a surface and a pair of first walls extending outwardly from said surface; and a second component having a surface facing said surface of said first component, said second component having a pair of second walls and a pair of inner walls positioned between said pair of second walls, said pair of second walls and said pair of inner walls extending outwardly from said surface of said second component;

each one of said pair of second walls is welded to a corresponding one of said pair of first walls at primary weld joints, said primary weld joints bounding a perimeter of said pair of inner wall, said pair of inner walls sealingly contacts said surface of said first component to define a fluid passage therebetween and a pair of cavities, one of said pair of cavities positioned on either side of said fluid passage.

19. The fluid delivery system of claim 18, wherein said pair of inner walls have a length that is greater than a length of each of said pair of first walls and said pair of second walls.

20. The fluid delivery system of claim 18, wherein each of said pair of inner walls are spaced apart from said pair of second walls, and wherein each one of said pair of cavities on each side of said fluid passage is defined by a space between an outer side of said pair of inner walls, an inner side of said pair of first walls, an inner side of said pair of second walls, said surface of said first component and said surface of said second component.

* * * * *